US011901686B2

(12) United States Patent
Hsu

(10) Patent No.: US 11,901,686 B2
(45) Date of Patent: Feb. 13, 2024

(54) JUNCTION BOX

(71) Applicant: Hung Sheng Hsu, Taipei (TW)

(72) Inventor: Hung Sheng Hsu, Taipei (TW)

( * ) Notice: Subject to any disclaimer, the term of this patent is extended or adjusted under 35 U.S.C. 154(b) by 150 days.

(21) Appl. No.: 17/645,285

(22) Filed: Dec. 20, 2021

(65) Prior Publication Data

US 2022/0216622 A1 Jul. 7, 2022

(30) Foreign Application Priority Data

Jan. 1, 2021 (TW) ................................ 110100002

(51) Int. Cl.
*H01R 4/48* (2006.01)
*H01R 9/24* (2006.01)
*H01R 9/26* (2006.01)

(52) U.S. Cl.
CPC ....... *H01R 4/48185* (2023.08); *H01R 9/2416* (2013.01); *H01R 9/26* (2013.01)

(58) Field of Classification Search
CPC ...... H01R 4/4818; H01R 9/2416; H01R 9/26; H01R 11/09; H01R 4/4809; H01R 11/01
See application file for complete search history.

(56) References Cited

U.S. PATENT DOCUMENTS

2014/0287630 A1 9/2014 Hoppmann
2020/0328586 A1* 10/2020 Eriksen ................ H02H 1/0007

FOREIGN PATENT DOCUMENTS

CN 107912073 A * 4/2018 ............. H01R 25/14
EP 3320582 A1 5/2018

* cited by examiner

*Primary Examiner* — Jean F Duverne
(74) *Attorney, Agent, or Firm* — MUNCY, GEISSLER, OLDS & LOWE, P.C.

(57) ABSTRACT

A junction box includes a box body and a conductive bar. A guide plate extends from a lead insertion opening, with a laterally extended connection portion at its extended end to connect the box body. First and second support plates and edges of the guiding plate form passages accessible to a lead insert space defined by the guiding plate, the connecting portion, the second support plate and the box body. The conductive bar has a bent conductive arm that moves into the inside of the lead insert space by an elastic force, therefore locked in said space, after it passes the passages.

15 Claims, 7 Drawing Sheets

JUNCTION BOX

TECHNICAL FIELD OF THE INVENTION

The present invention relates to a junction box, in particular to a junction box that has a simplified and rigid structure and is easy to assemble.

BACKGROUND OF THE INVENTION

Junction box, also known as terminal box, is a connector device used to electrically connect one lead with one or more other leads, or with one or more electrical connector terminals.

The basic structure of the junction box includes a housing, a lead insertion hole or insertion opening, at least one conductive bar, and at least one spring clamp for pressing an inserted lead against the conductive bar. The connection between the lead and other leads or connector terminals is accomplished by the conductive bar.

The junction box also provides a guide plate at a downstream position relative to the lead insertion hole or insertion opening, to guide the inserted lead, especially the bare conductor at the front end of the lead. In application, several junction boxes are tightly arranged side by side, therefore necessary insulating elements must be provided between two of them, to avoid contact between the conductive elements of two adjacent junction boxes, which may form a short circuit.

US Patent Publication US2014/287630 discloses a "Connecting terminal with a web-shaped conductor guide." The connecting terminal is in the form of a junction box, and a guide plate extending in the direction of the box body is arranged at the lead insertion opening. On the one hand, it is used to guide the insertion of the lead and on the other hand to isolate the exposed part of the lead end. A conductive bar forms a U-shape that opens upward. The two side arms of the conductive bar are respectively used for electrical connection with a lead inserted into the box through the insertion opening. The end of the guide plate away from the insertion opening forms a free end. A gap is formed between the free end and the bottom plate of the box body. A gap is also formed between one side of the guide plate and the side wall of the box body. One side arm of the conductive bar and a portion adjacent to the side arm are respectively inserted into the side gap and the free end gap, whereby the conductive bar is affixed in the junction box. A portion of the width of the conductive bar that exposes from the gaps surrounds the space covered by the guide plate and provides a surface for electrical contact with the inserted lead. A spring clamp in the box body, at a side of the guide plate, presses the lead, that is, the bare end of the lead, to the side arm to form a firm electrical contact. On the other side of the U-shape, the junction box also provides a similar structure for inserting another lead to form an electrical connection with the other side bar of the conductive bar.

European Patent Publication EP3320582 discloses a connection terminal, which also forms a junction box. The junction box is used to electrically connect an inserted lead with a bus bar. A guide plate is provided below the lead insertion opening, that is, downstream of the insertion direction. A gap is formed between the guide plate and a stopper. An L-shaped conductive bar is disposed in the gap. A first spring clamp presses the conductive bar to the bus bar. A second spring clamp presses the inserted lead against the conductive bar.

In the prior art, the conductive bar of the junction box is embedded in a gap formed by the lead guide plate and the box wall for fixation. The guide plate configured in this way can be integrally formed with the junction box body, and at the same time provides the functions of guiding, insulating and fixation. However, because this guide plate extends from the lead insertion opening, and its extended end provides a free end for the conductive bar to engage, the free end portion is easy to withstand excessive pressure and rupture, causing the conductive bar to fall off.

SUMMARY OF THE INVENTION

The objective of the present invention is to provide a junction box with a novel structure that can overcome the shortcomings of the conventional device.

The junction box according to the present invention comprises a box body and a conductive bar. The box body is provided with first and second lead insertion openings, first and second guide plates each extending from an opening, and first and second lateral connecting portions each in connection with an extending end of a corresponding guide plate and the box body. At least two sets of first and second positioning plates each forming a passage space with one guide plate in connection with a lead insertion space defined by the corresponding guide plate, the corresponding connecting portion and the corresponding positioning plate. The shape of the conductive bar is specially designed so that after two conductive arms enter the lead insertion space through the passage space, they move into an inside of the lead insertion space.

Specifically, the invented junction box comprises a box body, comprising a side wall and at least one box wall, wherein the side wall provides at least two lead insertion openings for a least to be inserted; and a conductive bar arranged in the box body, comprising a man body and two conductive arms, and each conductive arm points to a lead insertion opening;

wherein the box body further comprises:

at least two guide plates, each attached to the box body and extending from a lead insertion opening in a wire insertion direction;

a laterally connecting portion connected to an extended end of a guide plate and the side wall;

at least two sets of first and second positioning plates protruding laterally from the box wall, configured to respectively form a first passage space between a first positioning plate and an extended end of a corresponding guide plate, and a second passage space between a second positioning plate and one side of the corresponding guide plate; and each to define a lead insertion space by one second positioning plate, a corresponding guide plate, a connecting portion, and the box wall, the lead insertion space being accessible from the second passage space; wherein the first and/or the second positioning plate can also be a wall of the box body; and wherein a part of the main body of the conductive bar is arranged between the connecting portion and the first positioning plate, and the conductive arms on both sides of the conductive bar are located inside the lead insertion space; and a thickness of the conductive bar is configured so that the conductive arms on both sides can pass through the corresponding second passage space and enter the corresponding lead insertion space;

characterized in that an extending direction of the two conductive arms is substantially parallel, and after the conductive arms on both sides of the conductive bar enter the lead insertion space, they move from the plane of the second passage space to the inside of the lead insertion space.

The junction box may further comprise a spring clamp disposed in the lead insertion space, at an opposite side of the second positioning plate, to press an inserted wire toward a conductive arm.

The extending direction of the two conductive arms of the conductive bar can be opposite. In such embodiments, the main body of the conductive arm is substantially linear, or comprise two sections that form an angle, or two arm sections that keep a certain distance from each other.

The extending direction of the two conductive arms of the conductive bar can be substantially the same. In such embodiments, the conductive arm may include two arm sections forming an angle.

The extending direction of the two conductive arms of the conductive bar can form an angle. In such embodiments, the conductive arm may include two arm sections forming an angle.

In a preferred embodiment of the present invention, the conductive arms on both sides to move into the inside of the lead insertion space preferably by an elastic force. In such embodiments, one or more slight bend may be formed on the main body of the conductive bar, to provide the elastic force. In addition, the end portion of the conductive arms on both sides can also be bent toward the main body.

The conductive bar may further comprise a third conductive arm attached to the main body of the conductive bar. The conductive bar may further include a fourth conductive arm attached to the main body of the conductive bar. The extending directions of the third conductive arm and the fourth conductive arm can be the same or opposite to the extending direction of one of the two side arms, and can also form an angle with them.

These and other objectives and advantages of the present invention can be more clearly appreciated from the following description of the preferred embodiments of the present invention and with reference to the drawings.

DETAILED DESCRIPTION OF THE INVENTION

Several embodiments of the junction box of the present invention will be described below with reference to the drawings. The purpose of the embodiments is to enable readers to understand the basic principles, important and general features of the present invention, and not to limit the scope of the present invention.

Figure 1:
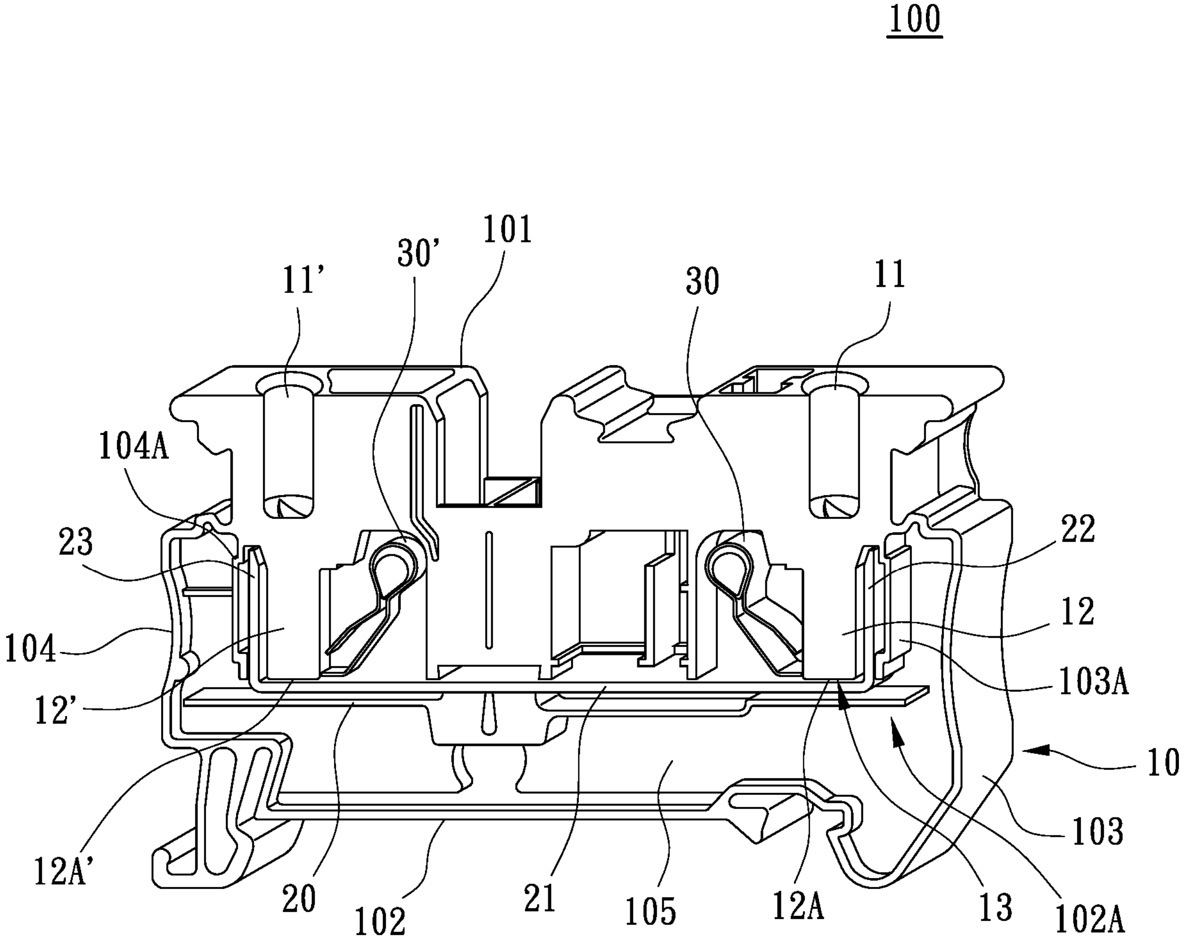
FIG. 1 shows a right-side perspective view of an embodiment of the junction box of the present invention.
Figure 2:
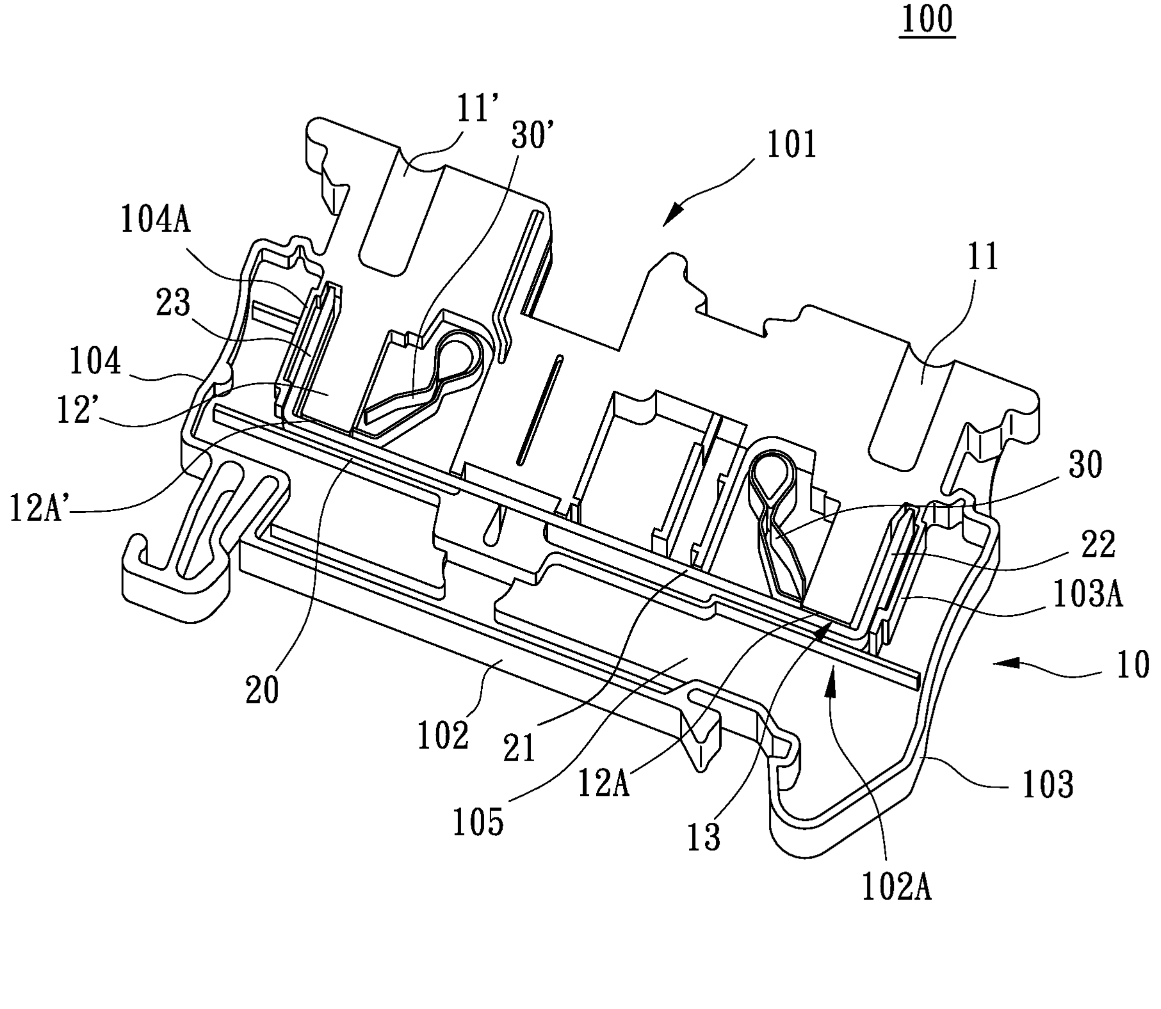
FIG. 2 shows another perspective view of the junction box of the embodiment of FIG. 1.

FIG. 1 shows a right-side perspective view of an embodiment of the junction box of the present invention, and FIG. 2 shows another perspective view of the embodiment of FIG. 1. As shown in the figure, the junction box 100 of the present invention has a box body 10. The box body 10 usually has a complete box wall 105 on the side away from the reader to provide insulation and protection. The box body 10 can generally be exposed to the reader, with only the least necessary shielding. This design can reduce the thickness of the box, while it is also feasible to provide a complete box wall, or a cover, on the near side. The figures also show the side walls 101-104 protruding around the box wall 105. In the embodiment of FIG. 1, the junction box 100 roughly includes four side walls.

The junction box 100 is structurally divided into two symmetrical sides by a longitudinal centerline. A lead insertion opening 11, 11' is provided on both sides for external leads (not shown) to be inserted. The leads that can be used in the present invention are not particularly limited, and can be various coated or uncoated leads, cables, and the like. The ends of the leads are usually bare metal leads to provide electrical conductions. If the lead insertion direction is inward, a conductive bar 20 is provided inside the lead insertion opening 11, 11'. The conductive bar 20 is made of or contains a conductive material. Suitable conductive materials include various metals, conductive plastics or ceramics. Useful conductive materials are copper, silver, gold, iron, nickel, tin, aluminum, cadmium, etc. The most common are steel, aluminum and copper. The conductive bar 20 includes a main body 21 and a first conductive arm 22 and a second conductive arm 23 provided on both sides of the main body 21. The first conductive arm 22 and the second conductive arm 23 extend toward the opening direction of the lead insertion openings 11, 11'. In the embodiment shown in FIG. 1, the lead insertion openings 11, 11' are provided on a first side wall 101, e.g., the upper side wall of the box body 10, shown in the figure.

In this embodiment, the first conductive arm 22 and the second conductive arm 23 both extend toward the first side wall 101. However, the extending direction of the first conductive arm 22 and/or the second conductive arm 23 is not limited to the direction of the first side wall 101.

The guide plates 12, 12' respectively extend from the inner side of the lead insertion openings 11, 11' in the extending direction of the lead, that is, extend inward. The guide plates 12, 12' preferably start to extend from a position of the box body at the lead insertion opening 11, 11'. In this embodiment, the guide plates 12, 12' are preferably integrally formed with the box body 10. However, it is also possible to install separate guide plates 12, 12' on the box body 10. The guide plates 12, 12' respectively extend inward to a position where the main body 21 of the conductive bar 20 is to be installed. The first positioning plate 102A is used in supporting the conductive bar 20. In a preferred embodiment of the present invention, the first positioning plate 102A is the second side wall 102 of the box body 10, that is, the box wall on the side opposite to the first side wall 101. However, the first positioning plate 102A can also be an additional plate, and is preferably formed by extending the box body 10. According to the junction box 100 of the present invention, the extended ends 12A, 12A' of the guide plates 12, 12' and the first positioning plate 102A are kept at a predetermined distance, and first passage spaces 12C, 12C' are formed between the two, to allow the main body 21 of the conductive bar 20 to pass through during assembly. To achieve this, the distance between the extended ends 12A, 12A' of the guide plates 12, 12' and the first positioning plate 102A is preferably slightly larger than the thickness of the conductive bar 20, or at least slightly larger than the thickness of the part of the main body 21 corresponding to the positioning space 13, 13'.

A plurality of positioning plates 103A, 104A can be additionally formed on the box body 10 to support and/or position the conductive bar 20. The plurality of positioning plates can also be extended from the box body 10 and formed integrally, but it can also be the third side wall 103 and the fourth side wall 104.

The spring clamps 30, 30' are arranged inside the box body 10, and are respectively located on the opposite sides of the first conductive arm 22 and the second conductive arm 23 with respect to the guide plates 12, 12' to provide a pressing force to push the leads against the first conductive arm 22 and the second conductive arm 23, respectively, after the leads are located inside the junction box 100, behind the guide plates 12, 12'.

Figure 3:
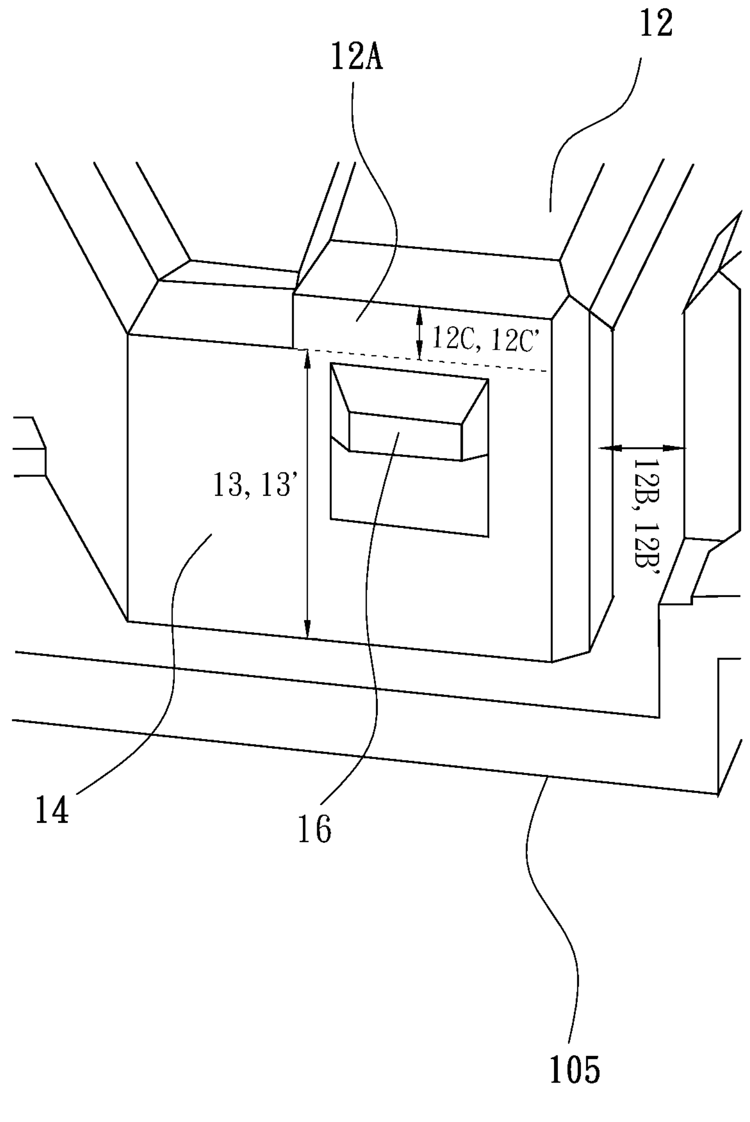
FIG. 3 shows a perspective view of one example of a connecting portion useful in the junction box of the present invention.

The junction box 100 according to the present invention further includes connecting portions 14, 14' formed between the extended ends 12A, 12A' of the guide plates 12, 12' and the corresponding box wall 105. FIG. 3 shows a side view of a connecting portion 14 suitable for the junction box 100 of the present invention. The connecting portions 14, 14' are generally formed in a plate shape. In the embodiment shown in FIG. 3, the connecting portion 14 connects the extended end 12A of the guide plate 12 and the box wall 105 of the box body 10 to support the conductive bar 20. Specifically, after the conductive bar 20 passes through the first passage spaces 12C, 12C' between the extension ends 12A, 12A' of the guide plates 12, 12' and the first positioning plate 102A, it enters the positioning spaces 13, 13' between the connecting portion 14 and the first positioning plate 102A. Here, the first passage spaces 12C, 12C' may also be an extension of the positioning spaces 13, 13'.

On both sides of the box body 10, the guide plate 12, the connecting portion 14, the second positioning plate 103A and the box wall 105 define a first lead insertion space, while the guide plate 12', the connecting portion 14', the second positioning plate 103A and the box wall 105 define a second lead insertion space, respectively for electrically connecting a lead and the conductive bar 20, after the lead is inserted, so that the two leads form an electrical connection.

According to the present invention, the width of the conductive bar 20, that is, the width in the to-and-from direction in FIG. 1, is configured so that, after the conductive bar 20 passes the first passage space 12C and 12C' between the extended ends 12A, 12A' and the first positioning plate 102A, there will be no part located in the first passage space 12C, 12C'. This design is purely a manufacturing consideration. If necessary, the width of the part can also be configured to include the first passage space 12C and 12C' between the extended ends 12A, 12A' of the guide plates 12, 12' and the first positioning plate 102A, and the positioning spaces 13, 13' between the connecting portion 14, 14' and the first positioning plate 102A, while the width of the first conductive arm 22 and the second conductive arm 23 is preferably not greater than the width of the positioning spaces 13, 13' between the connecting portion 14 and the first positioning plate 102A. However, the disadvantage of this design is that the shape of the conductive bar 20 is made complicated.

In addition, the box body 10 also includes second positioning plates 103A and 104A, provided adjacent to a lateral edge of the guide plate 12, 12', that is, the side edge extending perpendicular to the extended ends 12A, 12A' of the guide plates 12, 12', with a predetermined distance to the guide plates 12, 12'. The second positioning plates 103A and 104A are used to support the conductive bar 20, in particular, the first conductive arm 22 and the second conductive arm 23 of the conductive bar 20. In a preferred embodiment of the present invention, the second positioning plates 103A and 104A are the third side wall 103 and the fourth side wall 104 of the box body 10, that is, the two side walls connecting the first side wall 101 and the second side wall 102. However, the second positioning plates 103A and 104A may also be additional plates, and are preferably formed by extending the box body 10. According to the present invention, a predetermined distance is maintained between the lateral edge of the guide plates 12, 12' and the positioning plates 103A, 104A, and second passage spaces 12B, 12B' are formed between the two. The first conductive arm 22 and the second conductive arm 23 of the conductive bar 20 are allowed to pass the second passage spaces 12B, 12B during assembly. To achieve this, the distance between the lateral edge of the guide plates 12, 12' and the second positioning plates 103A, 104A is preferably slightly greater than the thickness of the first conductive arm 22 and the second conductive arm 23.

Figure 4:
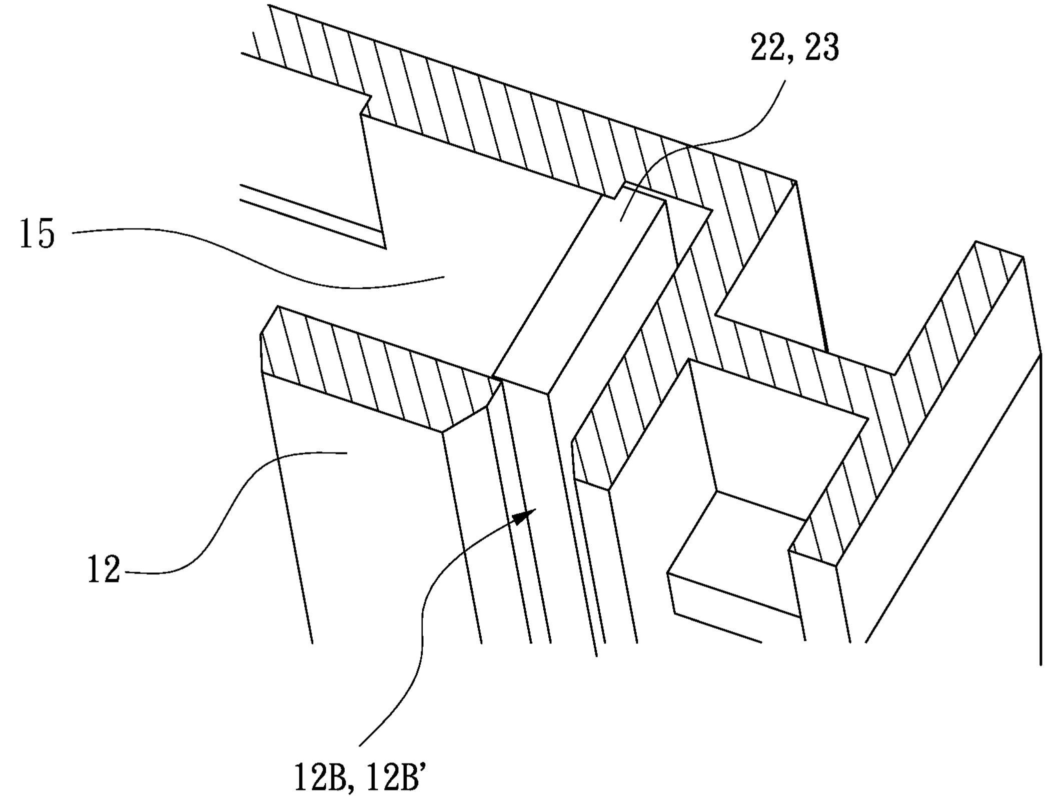
FIG. 4 shows the relative position of a conductive arm and a lead guide plate, after the conductive arm enters the inside of the lead insertion space.
Figure 5:
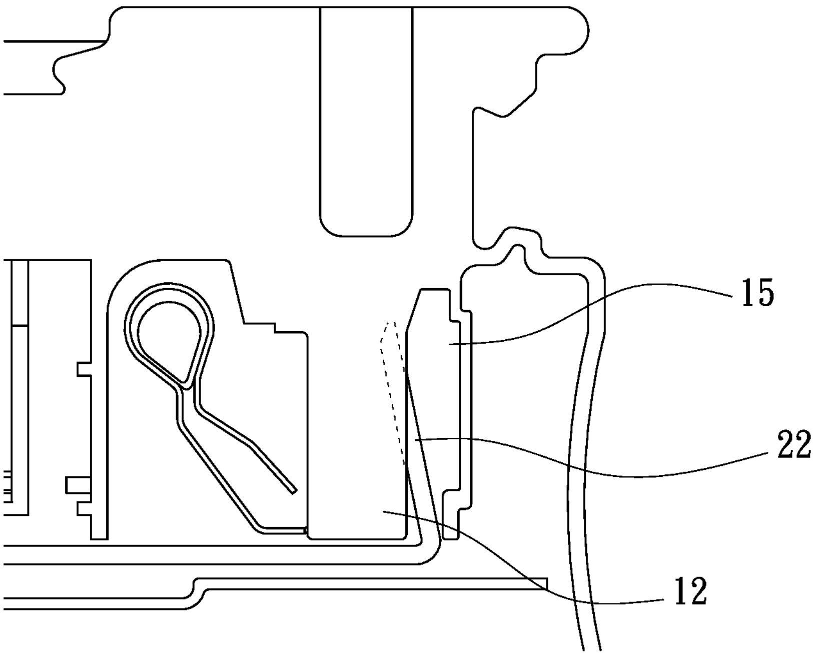
FIG. 5 shows one example of the shape of one conductive arm useful in the junction box of the present invention.

According to a preferred embodiment of the present invention, the first conductive arm 22 and the second conductive arm 23 of the conductive bar 20 pass through the second passage spaces 12B, 12B' during assembly, and then enter the lead insertion space 15, respectively, i.e., the space defined by the guide plate 12, the box wall 105 and the second positioning plates 103A, 104A, respectively, see FIG. 4.

In addition, the first conductive arm 22 and the second conductive arm 23 of the conductive bar 20 are configured so that the first conductive arm 22 and the second conductive arm 23 moves from the plane of the second passage spaces 12B, 12B' to the inside of the lead insertion space 15, after they enter the lead insertion space 15.

FIG. 4 show the relative position of the first conductive arm 22 and the second conductive arm 23 after the movement in a side view. In this state after the movement, the free ends of the first conductive arm 22 and the second conductive arm 23, or the part containing the free ends, will be stuck on the inner side of the guide plates 12, 12' to achieve a stable positioning and to provide a more stable clamping effect to the inserted lead.

In a preferred embodiment of the present invention, the force to move the first conductive arm 22 and the second conductive arm 23 into the inside the lead insertion space 15, after they passes through the second passage space 12B, 12B', is preferably an elastic force. To achieve this, one or more slight bend may be formed on the main body 21 of the conductive bar 20. For example, a bend that protrudes opposite to the extending direction of the first conductive arm 22 or the second conductive arm 23 may be formed. When assembling the conductive bar 20, flatten the main body 21 with hands or a jig (not shown) and insert the conductive bar 20 into the first and second passage spaces 12C, 12C'. After passing through, release the external force to restore the conductive bar 20 to its original shape. The first conductive arm 22 and the second conductive arm 23 will move to the inside of the lead insertion space 15 due to elastic forces.

Alternatively or additionally, the free ends of the first conductive arm 22 and/or the second conductive arm 23 of the conductive bars 20 may be slightly bent in the direction of the main body 21, so that the bent section forms an angle slightly less than 180 degrees. When assembling, the conductive arms are flattened with a tool and then the conductive bar 20 is inserted into the first and second passage spaces 12C, 12C'. After passing, the external force is released to restore the conductive bar 20 to its original shape. The free end of the first conductive arm 22 and/or the second conductive arm 23 moves into the lead insertion space 15 due to elastic forces.

Another alternative or additional arrangement is to make the conductive bar 20 so that the first conductive arm 22 and/or the second conductive arm 23 is slightly bent in the direction of the main body. After entering the lead insertion space 15, the part can be stuck on the rear side of the guide plate 12, 12'.

After the assembly is completed, the conductive bar 20 will be located inside the lead insertion space 15 between the guide plates 12, 12' and the box wall 105. It is usually not located in the first passage space 12C, 12C' and/or the second passage space 12B, 12B'.

In a preferred embodiment of the present invention, the connecting portion 14 at the extended end of the guide plate 20 may be provided with a positioning block 16, see FIG. 3. At the same time, a positioning notch (not shown) can also be provided at the corresponding position of the main body 21 of the conductive bar 20. When assembling, after the conductive bar 20 passes through the first passage spaces 12C, 12C' and the second passage spaces 12B, 12B', the positioning block 16 can be embedded in the positioning notch to achieve a more stable positioning.

Figure 6A:
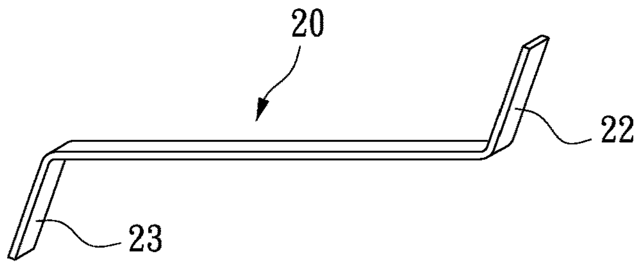
FIGS. 6A-6D show several examples of the shape of a conductive bar suitable for the junction box of the invention.
Figure 6B:
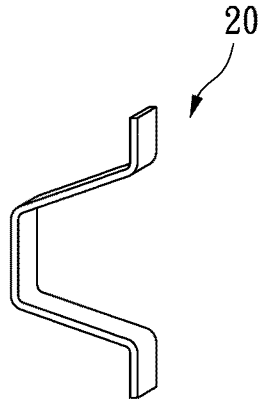
Figure 6C:
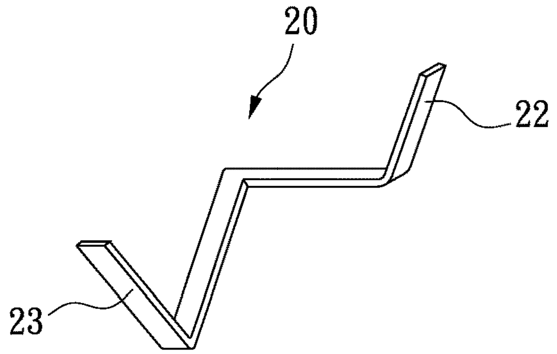
Figure 6D:
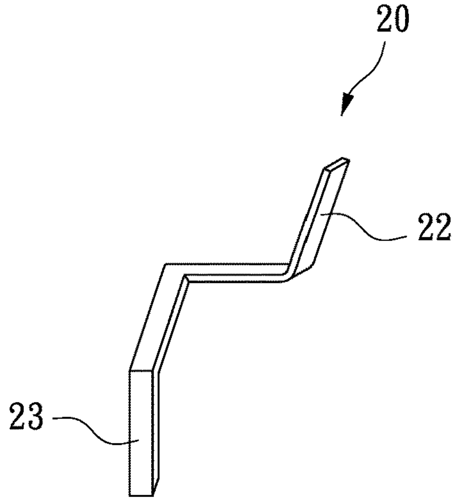

Although the conductive bar 20 shown in FIGS. 1 and 2 has a U shape, i.e., a linear main body 21 and two conductive arms 22, 23 extending towards the same direction, this is only one example of the shape of the conductive bar 20. In the preferred embodiments of the present invention, the extending direction of the two conductive arms of the conductive bar can be opposite, the same or form an angle. FIGS. 6A-6D show several examples of the shape of the conductive bar suitable for the junction box of the present invention. FIG. 6A shows a linear conductive bar 20 main body 21 with the first conductive arm 22 and the second conductive arm 23 extending in opposite directions. In this embodiment, two lead insertion openings 11, 11' are provided on the first side wall 101 and the second side wall 102 opposite to the first side wall 101, both of the box body 10, respectively. FIG. 613 shows that the main body 21 of the conductive bar 20 is in the U shape, and the two conductive arms extending directions of the first conductive arm 22 and the second conductive arm 23 are opposite. In this embodiment, two lead insertion openings 11, 11' are provided on the first side wall 101 and the second side wall 102 of the box body 10, respectively. FIG. 6C shows the main body 21 of the conductive bar 20 includes two sections, forming an angle of about 90 degrees, with one section extending towards the right in the drawing and the other towards the reader. The two conductive arms 22, 23 both point to the upper direction of the drawing. In this embodiment, the two lead insertion openings 11, 11' are both provided on the first side wall 101 of the box body 10, but the first side wall 101 includes a portion extending in the thickness direction. FIG. 6D shows the main body 21 of the conductive bar 20 includes two sections forming an angle of about 90 degrees, with one section extending towards the right in the drawing and the other towards the reader. The two conductive arms both point to the reverse directions, that is, upper and lower directions, both of the drawing. In this embodiment, the two lead insertion openings 11, 11' are provided on the first side wall 101 and the second side wall 102, respectively, of the box body 10, but the second side wall 101 includes a portion extending in the thickness direction.

In addition, the conductive bar 20 may further include a third conductive arm 24 and/or a fourth conductive arm 25. The third conductive arm 24 and/or the fourth conductive arm 25 may be provided by a second conductive bar attached to the main body of the conductive bar 20. The extension directions of the third conductive arm and the fourth conductive arm can be the same or opposite to the extension direction of one of the two conductive arms, and can also form an angle.

FIG. 7 shows several examples of the structure of the conductive bar suitable for the junction box of the present invention. As shown in FIG. 7A, the conductive bar 20 includes a third conductive arm 24 attached to the main body 21 of the conductive bar 20, and the extension direction of the third conductive arm 24 is opposite to the first conductive arm 22 and the second conductive arm 23. FIG. 7B shows that the conductive bar 20 includes a third conductive arm 24 and a fourth conductive arm 25 attached to the main body of the conductive bar 20, and the extension direction of the latter two is opposite to the first conductive arm 22 and the second conductive arm 23.

Figure 7A:
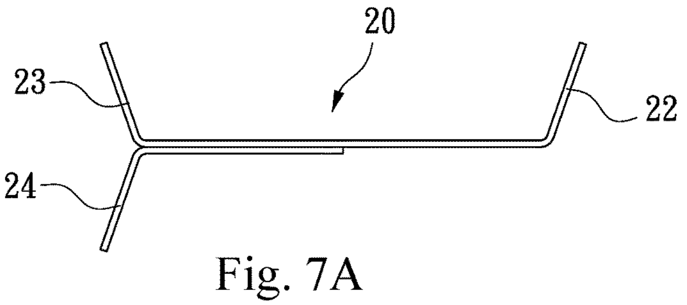
FIG. 7A-7F show several examples of the structure of a conductive bar applicable to the junction box of the present invention.
Figure 7B:
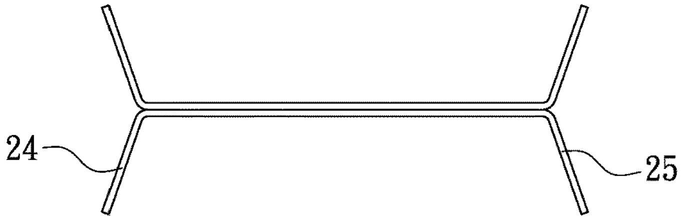
Figure 7C:
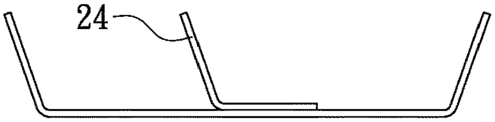
Figure 7D:
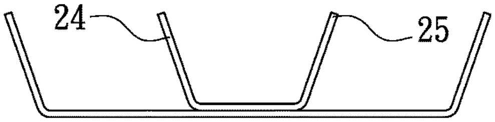
Figure 7E:
Figure 7F:
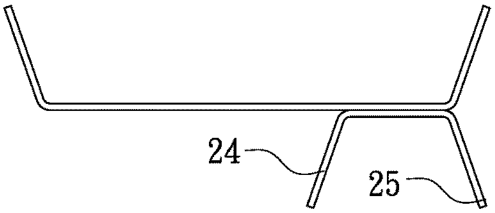

In the example shown in FIG. 7C, the conductive bar 20 includes a third conductive arm 24 attached to the main body of the conductive bar 20, and the extension direction of the third conductive arm 24 is the same as the first conductive arm 22 and the second conductive arm 23. FIG. 7D shows that the conductive bar 20 includes a third conductive arm 24 and a fourth conductive arm 25 attached to the main body of the conductive bar 20, and the extension direction of the two is the same as the first conductive arm 22 and the second conductive arm 23. In the example shown in FIG. 7E, the conductive bar 20 includes a third conductive arm 24 attached to the main body of the conductive bar 20, and the extension direction of the third conductive arm 24 is the same as that of the first conductive arm 22 and opposite to the second conductive arm 23. FIG. 7F shows that the conductive bar 20 includes a third conductive arm 24 and a fourth conductive arm 25 attached to the main body of the conductive bar 20, and the extension direction of the two is opposite to the first conductive arm 22 and the second conductive arm 23.

In the above embodiments, the number, position and arrangement of the lead insertion openings 11, 11', guide plates 12, 12', spring clamps 30, 30', the first positioning plate 102A, and the second positioning plates 103A, 104A may need to be modified accordingly. However, this is not any problem for those skilled in the art. Details thereof are thus omitted.

The present invention has been described in relation to particular examples, which are intended in all respects to be illustrative rather than restrictive. Those skilled in the art will appreciate that many different combinations will be suitable for practicing the present invention. Various aspects and/or components of the described embodiments may be used singly or in any combination. It is intended that the specification and examples be considered as exemplary only, with a true scope and spirit of the invention being indicated by the following claims.

What is claimed is:

1. A junction box, comprising a box body, comprising a side wall and at least one box wall, wherein the side wall provides at least two lead insertion openings for a least to be inserted; and a conductive bar arranged in the box body, comprising a man body and two conductive arms, and each conductive arm points to a lead insertion opening;

wherein the box body further comprises:

at least two guide plates, each attached to the box body and extending from a lead insertion opening in a wire insertion direction;

a laterally connecting portion connected to an extended end of a guide plate and the side wall;

at least two sets of first and second positioning plates protruding laterally from the box wall, configured to respectively form a first passage space between a first positioning plate and an extended end of a corresponding guide plate, and a second passage space between a second positioning plate and one side of the corresponding guide plate; and each to define a lead insertion space by one second positioning plate, a corresponding guide plate, a connecting portion, and the box wall, the lead insertion space being accessible from the second passage space; and wherein a part of the main body of the conductive bar is arranged between the connecting portion and the first positioning plate, and the conductive arms on both sides of the conductive bar are located inside the lead insertion space; and a thickness of the conductive bar is configured so that the conductive arms on both sides can pass through the corresponding second passage space and enter the corresponding lead insertion space;

wherein an extending direction of the two conductive arms is substantially parallel, and after the conductive arms on both sides of the conductive bar enter the lead insertion space, they move from the plane of the second passage space to the inside of the lead insertion space.

2. The junction box according to claim 1, wherein the first and/or the second positioning plate is a side wall of the box body.

3. The junction box according to claim 1, further comprising a spring clamp disposed in the lead insertion space, at an opposite side of the second positioning plate, to press an inserted wire toward a conductive arm.

4. The junction box of claim 1, wherein one or more slight bend is provided on the main body of the conductive bar, with a protrusion direction opposite to an extending direction of the first conductive arm.

5. The junction box of claim 1, wherein one of the first and second conductive arms of the conductive bars is further bent towards the main body, to form an angle slightly less than 90 degrees with the main body.

6. The junction box according to claim 1, wherein an extending direction of the two conductive arms of the conductive bar is opposite.

7. The junction box according to claim 6, wherein the main body of the conductive bar is substantially linear, or comprise two sections that form an angle, or two arm sections that keep a certain distance from each other.

8. The junction box according to claim 1, wherein an extending direction of the two conductive arms of the conductive bar is substantially the same.

9. The junction box according to claim 8, wherein the conductive arm comprises two arm sections forming an angle.

10. The junction box according to claim 1, wherein an extending direction of the two conductive arms of the conductive bar forms an angle.

11. The junction box according to claim 10, wherein the conductive arm comprises two arm sections forming an angle.

12. The junction box according to claim 1, wherein the conductive bar further comprise a third conductive arm attached to the main body of the conductive bar.

13. The junction box according to claim 12, wherein an extending direction of the third conductive arm is same or opposite to the extending direction of one of the first and second conductive arms, or forms an angle therewith.

14. The junction box according to claim 12, wherein the conductive bar further comprises a fourth conductive arm attached to the main body of the conductive bar.

15. The junction box according to claim 14, wherein an extending direction of the fourth conductive arm is same or opposite to the extending direction of one of the first, second and third conductive arms, or forms an angle therewith.

* * * * *